United States Patent
Ochs et al.

(10) Patent No.: US 10,108,184 B2
(45) Date of Patent: Oct. 23, 2018

(54) PRODUCTION INSTALLATION FOR A CHEMICAL OR PHARMACEUTICAL PRODUCT

(71) Applicant: BAYER AKTIENGESELLSCHAFT, Leverkusen (DE)

(72) Inventors: Stefan Ochs, Köln (DE); Stefan Schmitz, Köln (DE); Gerd Jagusch, Leverkusen (DE); Carsten Meyer, Köln (DE); Malik Busse, Langenfeld (DE)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 201 days.

(21) Appl. No.: 14/437,747

(22) PCT Filed: Nov. 6, 2013

(86) PCT No.: PCT/EP2013/073164
§ 371 (c)(1),
(2) Date: Apr. 22, 2015

(87) PCT Pub. No.: WO2014/072340
PCT Pub. Date: May 15, 2014

(65) Prior Publication Data
US 2015/0301522 A1    Oct. 22, 2015

(30) Foreign Application Priority Data
Nov. 8, 2012   (DE) ................. 10 2012 110 723

(51) Int. Cl.
*G05B 19/418* (2006.01)
*B01J 19/00* (2006.01)

(52) U.S. Cl.
CPC ........ *G05B 19/4185* (2013.01); *B01J 19/004* (2013.01); *B01J 2219/0002* (2013.01); *G05B 2219/32287* (2013.01); *Y02P 90/265* (2015.11)

(58) Field of Classification Search
CPC ............ B01J 19/004; B01J 2219/0002; G05B 2219/32287; G05B 19/4185; Y02P 90/265
See application file for complete search history.

(56) References Cited

U.S. PATENT DOCUMENTS

| 8,273,300 B2 * | 9/2012 | Elizarov .............. B01J 19/0093 422/129 |
| 2008/0233653 A1 | 9/2008 | Hess et al. |
| 2012/0107175 A1 | 5/2012 | Satyamurthy et al. |

FOREIGN PATENT DOCUMENTS

| DE | 199 17 398 A1 | 10/2000 |
| DE | 10 2005 013915 A1 | 9/2006 |
| WO | 2009/092392 A1 | 7/2009 |

OTHER PUBLICATIONS

International Search Report dated Jan. 14, 2014, dated Jan. 28, 2014.
English Translation of International Search Report dated Jan. 14, 2014, dated Jan. 28, 2014.

* cited by examiner

*Primary Examiner* — Shogo Sasaki
(74) *Attorney, Agent, or Firm* — McBee Moore Woodward & Vanik IP, LLC

(57) ABSTRACT

A production installation having at least two process modules (P1, . . . , Pn) that can be connected to one another for production engineering purposes and a communication network (2), wherein each process module (P1, . . . , Pn) has an electronic device by means of which the respective process module (P1, . . . , Pn) can be connected to the communication network (2) for communications engineering purposes and is set up to control and/or regulate the respective process module (P1, . . . , Pn) to independently carry out a particular process section of the production.

20 Claims, 1 Drawing Sheet

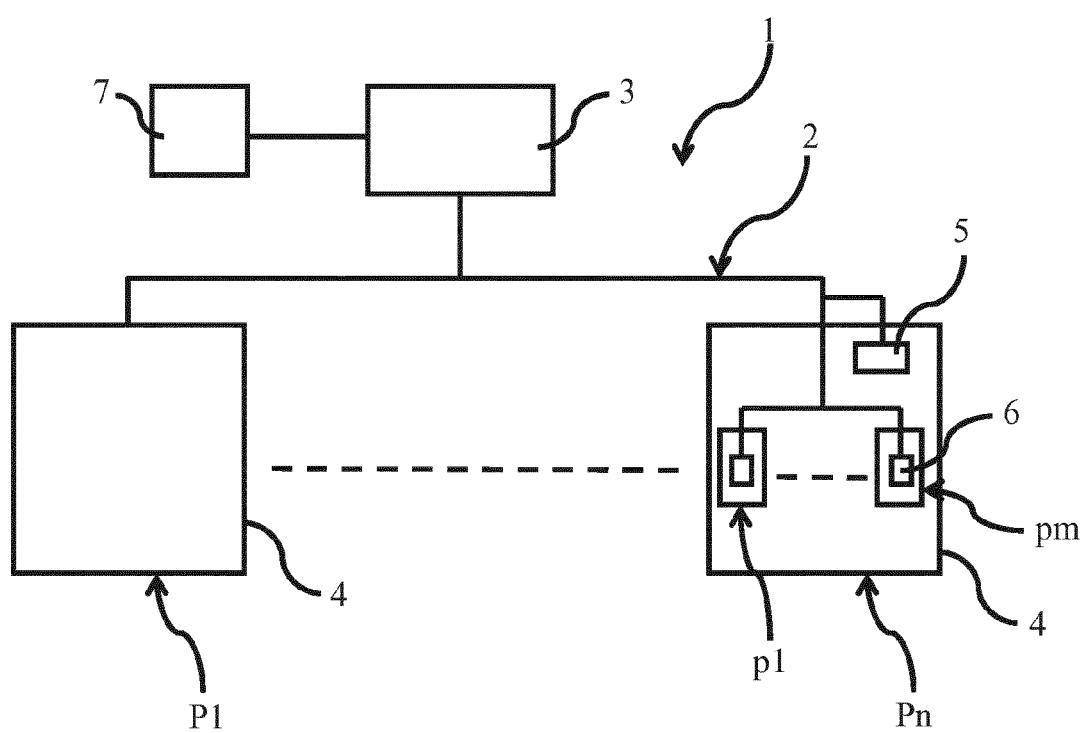

PRODUCTION INSTALLATION FOR A CHEMICAL OR PHARMACEUTICAL PRODUCT

This is a 371 of PCT/EP2013/073164 filed 6 Nov. 2013, which claims foreign priority benefit under 35 U.S.C. 119 of German Patent Application 10 2012 110 723.8 filed 8 Nov. 2012, the entire contents of which are incorporated herein by reference.

The work which led to this invention was sponsored by grant agreement no. 228867 as part of the European Union's seventh framework program RP7/2007-2013.

The present invention relates to a production plant for producing a chemical and/or pharmaceutical product.

BACKGROUND OF THE INVENTION

In order to produce a particular chemical and/or pharmaceutical product, it is necessary to provide a production plant having an individual plant structure in order to be able to carry out the process steps respectively required in terms of process engineering in individual process sections. If there is no longer a desire to produce this particular product, the production plant is usually dismantled again in order to be able to construct another production plant having an individual plant structure, which can be used to produce another chemical and/or pharmaceutical product, at the same location. This construction and dismantling of production plants is very time-consuming and cost-intensive. There is therefore a constant need to reduce the amount of effort associated with the production of different chemical and/or pharmaceutical products.

The object of the invention is to provide a novel plant concept which can be used to considerably reduce the amount of effort associated with the production of different chemical and/or pharmaceutical products in comparison with the conventional procedure.

SUMMARY OF THE INVENTION

According to the invention, the production plant has at least two process modules, which can be connected to one another for production purposes, and a communication network, wherein each process module has an electronic device, in particular a control and/or regulating device, which can be used to connect the respective process module to the communication network for communication purposes and is set up to control and/or regulate the respective process module to independently carry out a particular process section of production, wherein the electronic devices are set up in such a manner that process modules connected to the communication network for communication purposes can automatically communicate with one another at least in such a manner that at least one process module automatically requests information from at least one further process module, wherein the requestable information comprises at least information in the form of given and/or expected process parameters with regard to the process section carried out or to be carried out by the process module providing this information, wherein each electronic device of a process module is set up to use the information obtained from a further process module to control and/or regulate the process module assigned to it.

The process modules which can be connected to one another for production purposes are preferably units which can be transported as a whole, can be transported to a desired production site at which an accordingly equipped production plant is intended to be erected, and can be transported away from this site after the desired production has been concluded. This makes it possible to easily reuse individual process modules at different production sites in a manner that reduces production costs. For this purpose, a process module may have a housing which enables simple transport of the process module and in which process submodules, in particular process assemblies, suitable for carrying out the desired process section are arranged.

DETAILED DESCRIPTION

At a production site, the process modules can be connected, preferably via standardized couplings, to a permanently installed communication network and to a supply network which can be used to supply the process modules with material and/or energy and/or into which materials can be delivered, with the result that at least one chemical batch reaction and/or continuous production can be carried out in a substantially autonomous manner using the process modules. For example, the supply network may have a compressed air line for supplying compressed air, a feed water line for supplying water, an electrical line for supplying electrical energy, a materials line for supplying starting materials and/or auxiliary materials and/or for discharging products, by-products and/or waste materials, a cooling line for supplying cold or for dissipating heat and/or a heating line for supplying heat or for removing cold.

Additionally or alternatively, a material and/or energy store which can be connected to the supply network and/or a storage container for liquid, solid and/or gaseous materials may be provided inside the housing of a process module, with the result that chemical reactions can take place autonomously and independently of an external supply. The supply network can be used to transport, in particular, solid, liquid and/or gaseous materials or mixtures of materials which may be present in single-phase or multi-phase form, for example as a suspension or emulsion. The process modules may have, for example, functionalities for heating, cooling, mixing, separating, controlling the pressure, ventilating and/or venting which make it possible to carry out a chemical reaction and control reaction conditions.

Various wired or wireless communication networks come into consideration as the communication network. Standardized information interchange between the process modules connected to the communication network can be carried out via the communication network.

Each process module has an electronic device, in particular a control and/or regulating device, which can be used to connect the respective process module to the communication network for communication purposes. The electronic device preferably detects when the respective process module is connected to the communication network, after which the electronic device automatically feeds an identification signal into the communication network, from which signal the generic type of the process module is clear, for example.

The electronic device is set up to control and/or regulate the respective process module to independently carry out a particular process section of production. In this case, independently means that the process section is carried out using the process module without the process section or a part of the latter having to be controlled and/or regulated for this purpose by a device remote from the process module. The process module can accordingly thus operate autonomously.

The electronic devices are also set up in such a manner that process modules connected to the communication network for communication purposes can automatically communicate with one another in such a manner that at least one process module automatically requests information from at least one further process module. This automatic communication between the process modules is possible, in particular, if process modules which are connected to the communication network use their respective electronic device to output an identification signal to the communication network, which signal is received by process modules which are already connected to the communication network. As a result, the receiving process modules are preferably informed of the address of the process module newly connected to the communication network. In the case of the process modules which are already connected to the communication network or their electronic devices for example, this may be a trigger for these process modules to also emit a corresponding identification signal to the communication network, which signal is in turn received by the process module newly connected to the communication network. In this respect, the production plant particularly preferably has a plug and play functionality.

The information which can be requested from the further process modules comprises at least information in the form of given and/or expected process parameters with regard to the process section carried out or to be carried out by the process module providing this information. These process parameters can then be used to control and/or regulate a requesting process module. This is advantageous, in particular, for a subsequent process module which is intended to further process an intermediate product produced by a preceding process module in a temporally preceding process section. For this further processing by the subsequent process module, it is considerably important to know what properties the intermediate product produced by the preceding process module has in order to be able to determine which boundary conditions for producing the desired end product from the intermediate product exist and must be complied with by the subsequent process module.

Each electronic device of a process module is set up to use the information obtained from a further process module to control and/or regulate the process module assigned to it. In particular, different process parameters of a process section to be carried out by a subsequent process module can be varied on the basis of the information relating to a preceding process module which produces an intermediate product.

According to one advantageous refinement, at least one process module is modular and comprises at least two process submodules which can be connected to one another for process engineering purposes, wherein the electronic device of the modular process module is set up, before the start of the process section to be carried out by the process module, to detect, via the communication network, whether the process module comprises process submodules which are suitable for the process section to be carried out using the process module. For example, it is possible to detect in this case whether all process submodules needed to carry out a particular process section are available and are arranged relative to one another in a suitable manner. Furthermore, it is possible to detect whether the process conditions needed to carry out the particular process section can be complied with by a process submodule.

The process submodules for forming a process module are preferably arranged in a housing which enables simple transport of the respective process module, wherein the housing dimensioning can be standardized.

According to another advantageous refinement, the electronic device of a process module is set up, before the start of the process section to be carried out by the process module, to acquire information relating to the respective state of the process submodules via the communication network. The maintenance state of a process submodule and/or its certification after carrying out a technical safety check, during which a check is carried out in order to determine whether the state of the respective process submodule complies with legal specifications or the like, come(s) into consideration here as the state, for example.

It is also considered to be advantageous if the production plant has a superordinate control and/or regulating device which can be connected to the communication network for communication purposes, wherein the superordinate control and/or regulating device is set up to automatically request information from process modules connected to the communication network, wherein the information which can be requested by the superordinate control and/or regulating device comprises at least, on the one hand, information in the form of basic functions and/or special functions of the respective process module with respect to the basic processes and/or special processes which can be carried out using the respective process module and/or, on the other hand, information in the form of given and/or expected process parameters with respect to the process section carried out or to be carried out by the process module providing this information. The superordinate control and/or regulating device is preferably permanently installed at the respective production site at which a production plant is intended to be constructed, and also remains there after a described exchange of process modules for producing different products at the same production site. The superordinate control and/or regulating device may have a monitoring function by virtue of requested process parameters, for example, being monitored for their conformity with allowed process parameter ranges. If this is not the case, the production plant can be temporarily shut down using the superordinate control and/or regulating device. On the other hand, it is also possible for the superordinate control and/or regulating device to partially actively intervene in production without production being stopped.

Another advantageous refinement provides for each electronic device of a process module to be set up in such a manner that the special functions of the respective process module can be configured, wherein the superordinate control and/or regulating device is set up to configure individual electronic devices of process modules to carry out production in a production-specific manner on the basis of the information requested from process modules connected to the communication network. Process modules of a particular generic type can generally be used to implement different processes. The same process can also be carried out under different boundary conditions. For this purpose, it is possible to configure a special function of a process module in a production-specific manner, for example to vary process parameters within maximum possible parameter ranges. The configuration of individual special functions of process modules therefore enables very variable use of the process modules.

It is also proposed that the superordinate control and/or regulating device is set up, before the start of the production to be respectively carried out by the production plant, to detect, via the communication network, whether the production plant comprises process modules suitable for the production to be carried out using the production plant. This can be carried out by the electronic device of a process module in addition or as an alternative to the corresponding detection described above.

According to another advantageous refinement, each process submodule has a subordinate electronic device which can be used to connect the respective process submodule to the communication network for communication purposes and is set up to control and/or regulate the respective process submodule to independently carry out a particular process subsection of production, wherein the electronic devices are set up in such a manner that process submodules connected to the communication network for communication purposes can automatically communicate with one another and/or with process modules connected to the communication network at least in such a manner that at least one process submodule automatically requests information from at least one further process submodule or from at least one process module, wherein the requestable information comprises at least information in the form of given and/or expected process parameters with respect to the process subsection carried out or to be carried out by the process submodule providing this information or at least information in the form of given and/or expected process parameters with respect to the process section carried out or to be carried out by the process module providing this information, wherein each electronic device of a process submodule is set up to use the information obtained from a further process submodule or from a process module to control and/or regulate the process submodule assigned to it. This refinement can be considered to be similar to the above-described refinement and function of the process modules according to patent claim 1. According to this refinement, information can be interchanged either only within a hierarchical level between process submodules or, independently of the hierarchy, both between process submodules and between process submodules and process modules.

It is also considered to be advantageous if the superordinate control and/or regulating device is set up to automatically request information from process submodules connected to the communication network, wherein the information which can be requested by the superordinate control and/or regulating device comprises at least, on the one hand, information in the form of basic functions and/or special functions of the respective process submodule with respect to the basic processes and/or special processes which can be carried out using the process submodule and/or, on the other hand, information in the form of given and/or expected process parameters with respect to the process subsection carried out or to be carried out by the process submodule providing this information. The superordinate control and/or regulating device may also have a monitoring function in this case by virtue of requested process parameters, for example, being monitored for their conformity with allowed process parameter ranges. If this is not the case, the production plant can be temporarily shut down using the superordinate control and/or regulating device. On the other hand, it is also possible for the superordinate control and/or regulating device to partially actively intervene in production without production being stopped.

According to another advantageous refinement, each electronic device of a process submodule is set up in such a manner that the special processes which can be carried out using the respective process submodule can be configured, wherein the superordinate control and/or regulating device is set up to configure individual electronic devices of process submodules to carry out production in a production-specific manner on the basis of the information requested from process submodules or process modules connected to the communication network. Process submodules of a particular generic type can generally be used to carry out different processes. The same process can also be carried out under different boundary conditions. For this purpose, it is possible to configure a special function of a process submodule in a production-specific manner, for example to vary process parameters within maximum possible parameter ranges. The configuration of individual special functions of process submodules enables very variable use of the process submodules.

The superordinate control and/or regulating device is advantageously set up, before the start of the production to be carried out by the production plant, to acquire information relating to the respective state of the process submodules via the communication network. The maintenance state of a process submodule and/or its certification after carrying out a technical safety check, during which a check is carried out in order to determine whether the state of the process submodule complies with legal specifications or the like, also come(s) into consideration here as the state, for example.

Another advantageous refinement of the invention provides for the information interchanged via the communication network to be encapsulated. Such data encapsulation makes it possible to bundle particular information which is intended to be received only by a particular addressee, for example a process submodule, a process module or the superordinate control and/or regulating device. This considerably simplifies information interchange via the communication network.

It is also considered to be advantageous if the superordinate control and/or regulating device is set up to display the respective components of the production plant and/or information requested from individual process submodules or process modules on a display device. As a result, it can be clearly indicated to a responsible person at the production site how the respective production plant is composed or which process modules and process submodules are currently involved in particular production and the current state of production. The latter can be determined using process parameters acquired by the superordinate control and/or regulating device. The corresponding display enables a simple visual check of production by a responsible person, which has a positive effect on the operational safety of a corresponding production plant.

The invention is explained by way of example below with reference to the attached FIGURE using a preferred exemplary embodiment, in which case the features described below may constitute an aspect of the invention both per se and in combination with one another. In the FIGURE

BRIEF DESCRIPTION OF THE DRAWING

FIG. 1 shows an exemplary embodiment of a production plant 1 according to the invention. The production plant 1 comprises n process modules P1 to Pn, a communication network 2 and a superordinate control and/or regulating device 3. Process modules P1 to Pn are connected to one another and to the superordinate control and/or regulating device 3 for communication purposes via the communication network 2. A display device 7 is connected to the superordinate control and/or regulating device 3 for communication purposes.

Each process module P1 to Pn is modular and has a housing 4 in which m process submodules p1 to pm are arranged, in which case the number of process submodules p1 to pm for each process module P1 to Pn can be the same or different. Each process module P1 to Pn also comprises an electronic device 5 which is arranged in the housing 4, can be used to connect the respective process module P1, . . . , Pn to the communication network 2 for communication purposes and is set up to control and/or regulate the respective process module P1, . . . , Pn to independently carry out a particular process section of production. The electronic devices 5 are set up in such a manner that process modules P1, . . . , Pn connected to the communication network 2 for communication purposes can automatically communicate with one another at least in such a manner that at least one process module P1, . . . , Pn automatically requests information from at least one further process module P1, . . . , Pn, wherein the requestable information comprises at least information in the form of given and/or expected process parameters with regard to the process section carried out or to be carried out by the process module P1, . . . , Pn providing this information, wherein each electronic device 5 of a process module P1, . . . , Pn is set up to use the information obtained from a further process module P1, . . . , Pn to control and/or regulate the process module P1, . . . , Pn assigned to it.

The process submodules p1, . . . , pm are connected to one another for production and communication purposes via the communication network 2. The electronic device 5 of each modular process module P1, . . . , Pn is set up, before the start of the process section to be carried out by the process module P1, . . . , Pn, to detect, via the communication network 2, whether the process module P1, . . . , Pn comprises process submodules p1, . . . , pm which are suitable for the process section to be carried out using the process module P1, . . . , Pn. The electronic device 5 of each process module P1, . . . , Pn is also set up, before the start of the process section to be carried out by the process module P1, . . . , Pn, to acquire information relating to the respective state of the process submodules p1, . . . , pm via the communication network 2.

Each process submodule p1, . . . , pm has a subordinate electronic device 6 which can be used to connect the respective process submodule p1, . . . , pm to the communication network 2 for communication purposes and is set up to control and/or regulate the respective process submodule p1, . . . , pm to independently carry out a particular process subsection of production. The subordinate electronic devices 6 are set up in such a manner that process submodules p1, . . . , pm connected to the communication network 2 for communication purposes can automatically communicate with one another and/or with process modules P1, . . . , Pn connected to the communication network 2 at least in such a manner that at least one process submodule p1, . . . , pm automatically requests information from at least one further process submodule p1, . . . , pm or from at least one process module P1, . . . , Pn, wherein the requestable information comprises at least information in the form of given and/or expected process parameters with respect to the process subsection carried out or to be carried out by the process submodule p1, . . . , pm providing this information or at least information in the form of given and/or expected process parameters with respect to the process section carried out or to be carried out by the process module P1, . . . , Pn providing this information, wherein each electronic device 6 of a process submodule p1, . . . , pm is set up to use the information obtained from a further process submodule p1, . . . , pm or from a process module P1, . . . , Pn to control and/or regulate the process submodule p1, . . . , pm assigned to it.

The superordinate control and/or regulating device 3 is connected to the communication network 2 for communication purposes and is set up to automatically request information from process modules P1, . . . , Pn connected to the communication network 2, wherein the information which can be requested by the superordinate control and/or regulating device 3 comprises at least, on the one hand, information in the form of basic functions and/or special functions of the respective process module P1, . . . , Pn with respect to the basic processes and/or special processes which can be carried out using the respective process module P1, . . . , Pn and/or, on the other hand, information in the form of given and/or expected process parameters with respect to the process section carried out or to be carried out by the process module P1, . . . , Pn providing this information. Each electronic device 5 of a process module P1, . . . , Pn is set up here in such a manner that the special functions of the respective process module P1, . . . , Pn can be configured, wherein the superordinate control and/or regulating device P1, . . . , Pn is set up to configure individual electronic devices 5 of process modules P1, . . . , Pn to carry out production in a production-specific manner on the basis of the information requested from process modules P1, . . . , Pn connected to the communication network 2.

The superordinate control and/or regulating device 3 is also set up, before the start of the production to be respectively carried out by the production plant 1, to detect, via the communication network 2, whether the production plant 1 comprises process modules P1, . . . , Pn suitable for the production to be carried out using the production plant 1.

The superordinate control and/or regulating device 3 is also set up to automatically request information from process submodules p1, . . . , pm connected to the communication network 2, wherein the information which can be requested by the superordinate control and/or regulating device 3 comprises at least, on the one hand, information in the form of basic functions and/or special functions of the respective process submodule p1, . . . , pm with respect to the basic processes and/or special processes which can be carried out using the process submodule p1, . . . , pm and/or, on the other hand, information in the form of given and/or expected process parameters with respect to the process subsection carried out or to be carried out by the process submodule p1, . . . , pm providing this information. In this case, each electronic device 6 of a process submodule p1, . . . , pm is set up in such a manner that the special processes which can be carried out using the respective process submodule p1, . . . , pm can be configured, wherein the superordinate control and/or regulating device 3 is set up to configure individual electronic devices 6 of process submodules p1, . . . , pm to carry out production in a production-specific manner on the basis of the information requested from process submodules p1, . . . , pm or process modules P1, . . . , Pn connected to the communication network 2.

The superordinate control and/or regulating device 3 is moreover set up, before the start of the production to be carried out by the production plant 1, to acquire information relating to the respective state of the process submodules p1, . . . , pm via the communication network 2.

The superordinate control and/or regulating device 3 is also set up to display the respective components of the production plant 1 and/or information requested from individual process submodules p1, . . . , pm or process modules P1, . . . , Pn on the display device 7.

The invention claimed is:
1. A production plant for producing a chemical and/or pharmaceutical product comprising at least two process modules (P1, . . . , Pn), connected to one another for production purposes, and a communication network, wherein each one of the at least two process modules (P1, ..., Pn) includes an electronic device (E1, ..., $E_n$) wherein each electronic device (E1, ..., $E_n$) connects each of the at least two process modules (P1, ..., Pn) to the communication network for communication purposes and is additionally programmed to control and/or regulate each of the at least two process modules (P1, ..., Pn) to independently carry out a particular process section of production, wherein each of the electronic devices (E1, ..., $E_n$) are configured in such a manner that the at least two process modules (P1, ..., Pn) connected to the communication network for communication purposes automatically communicate with one another at least in such a manner that at least one of the at least two process modules (P1, ..., Pn) automatically requests information from at least one other of the at least two process modules (P1, ..., Pn), wherein the requested information comprises at least information in the form of given and/or expected process parameters with regard to the process section carried out or to be carried out by at least one of the at least two process modules (P1, ..., Pn) providing the requested information, wherein each electronic device (E1, ..., $E_n$) of the at least two process modules (P1, ..., Pn) is programmed to use the requested information obtained from a different one of the at least two process modules (P1, ..., Pn) to control and/or regulate the process module (P1, ..., Pn).

2. The production plant as claimed in claim 1, wherein at least one of the at least two process modules (P1, ..., Pn) is modular and comprises at least two process submodules (p1, ..., pm) which are connected to one another for process engineering purposes and are connected to the communication network for communication purposes, wherein the electronic device (E1, ..., $E_n$) of each one of the at least one of the modular process modules (P1, ..., Pn) is configured, before the start of a process section to be carried out by at least one of the at least two process modules (P1, ..., Pn), to detect, via the communication network, whether the at least one of the at least two process modules (P1, ..., Pn) comprises one or more process submodules (p1, ..., pm) which are suitable for the process section to be carried out using at least one of the at least two process modules (P1, ..., Pn).

3. The production plant as claimed in claim 2, wherein the electronic device (E1, ..., $E_n$) of at least one of the at least two process modules (P1, ..., Pn) is configured to acquire information relating to the respective state of the process submodules (p1, ..., pm) via the communication network before the start of the process section to be carried out by the at least two process modules (P1, ..., Pn).

4. The production plant as claimed in claim 1 further comprising a superordinate control and/or regulating device connected to the communication network for communication purposes, wherein the superordinate control and/or regulating device is programmed to automatically request information from at least one of the at least two process modules (P1, ..., Pn) connected to the communication network, wherein the information requested by the superordinate control and/or regulating device comprises at least information in the form of basic functions and/or special functions of the at least one of the at least two process modules (P1, ..., Pn) with respect to the basic processes and/or special processes carried out using the at least one of the at least two process modules (P1, ..., Pn) and/or information in the form of given and/or expected process parameters with respect to the process section carried out or to be carried out by the at least one of the at least two process modules (P1, ..., Pn) providing this information.

5. The production plant as claimed in claim 4, wherein each electronic device (E1, ..., $E_n$) of the at least two process modules (P1, ..., Pn) is programmed to configure the special functions of the at least two process modules (P1, ..., Pn), wherein the superordinate control and/or regulating device is programmed to configure individual electronic devices (E1, ..., $E_n$) of each of the at least two process modules (P1, ..., Pn) to carry out production in a production-specific manner on the basis of the information requested from the at least two process modules (P1, ..., Pn) connected to the communication network.

6. The production plant as claimed in claim 4, wherein the superordinate control and/or regulating device is configured to detect, via the communication network, whether the production plant comprises at least two process modules (P1, ..., Pn) suitable for the production to be carried out using the production plant before the start of the production to be carried out by the production plant.

7. The production plant as claimed in claim 2, wherein each of the one or more process submodules (p1, ..., pm) has a subordinate electronic device configured to connect each one of the one or more of the process submodules (p1, ..., pm) to the communication network for communication purposes and is programmed to control and/or regulate each one of the one or more process submodules (p1, ..., pm) to independently carry out a particular process subsection of production, wherein the subordinate electronic devices are programmed in such a manner that each one of the one or more process submodules (p1, ..., pm) connected to the communication network for communication purposes automatically communicate with at least one other of the one or more of the process submodules (p1 ... pm) and/or with at least one of the at least two of the process modules (P1, ..., Pn) connected to the communication network at least in such a manner that at least one of the one or more process submodules (p1, ..., pm) automatically requests information from at least one other of the one or more process submodules (p1, ..., pm) or from at least one of the at least two process modules (P1, ..., Pn), wherein the requestable information comprises at least information in the form of given and/or expected process parameters with respect to the process subsection carried out or to be carried out by the at least one of the one or more process submodules (p1, ..., pm) providing this information or at least information in the form of given and/or expected process parameters with respect to the process section carried out or to be carried out by the at least one of the at least one of the process modules (P1, ..., Pn) providing this information, wherein each electronic device of one or more of the process submodules (p1, ..., pm) is programmed to use the information obtained from a another of the one or more process submodules (p1, ..., pm) or from at least one of the at least one process modules (P1, ..., Pn) to control and/or regulate at least one of one or more the process submodules (p1, ..., pm) assigned to it.

8. The production plant as claimed in claim 7, wherein the superordinate control and/or regulating device is programmed to automatically request information from each of the one or more process submodules (p1, ..., pm) connected to the communication network, wherein the information which can be requested by the superordinate control and/or regulating device comprises at least information in the form of basic functions and/or special functions of each one of the one or more process submodules (p1, ..., pm) with respect to the basic processes and/or special processes which can be carried out using the each one of the one or more process submodules (p1, . . . , pm) and/or information in the form of given and/or expected process parameters with respect to the process subsection carried out or to be carried out by each one of the one or more process submodules (p1, . . . , pm) providing this information.

9. The production plant as claimed in claim 8, wherein each electronic device of the one or more process submodules (p1, . . . , pm) is configured in such a manner that each of the special processes which can be carried out using each one of the one or more process submodules (p1, . . . , pm) can be configured, wherein the superordinate control and/or regulating device is programmed to configure individual electronic devices of each one of the one or more process submodules (p1, . . . , pm) to carry out production in a production-specific manner on the basis of the information requested from at least one of the one or more process submodules (p1, . . . , pm) or at least one of the at least one process modules (P1, . . . , Pn) connected to the communication network.

10. The production plant as claimed in claim 8, wherein the superordinate control and/or regulating device is programmed to acquire information relating to the respective state of the one or more process submodules (p1, . . . , pm) via the communication network before the start of the production to be carried out by the production plant.

11. The production plant as claimed in claim 1, wherein the information interchanged via the communication network is encapsulated; wherein said encapsulated information is received only by a particular addressee.

12. The production plant as claimed in claim 1 further comprising a superordinate control and/or regulating device, wherein the superordinate control and/or regulating device is set up to display each one of the components of the production plant and/or information requested from each one of the one or more process submodules (p1, . . . , pm) or each one of the at least two process modules (P1, . . . , Pn) on a display device.

13. The production plant as claimed in claim 1 wherein at least one of the at least two process modules (P1, . . . , Pn) includes a housing enclosing the at least one of the at least two process modules (P1, . . . Pn.

14. The production plant as claimed in claim 1 further comprising a supply network connected to the production plant wherein the supply network delivers material and/or energy to at least one of the at least two process modules (P1, . . . , Pn).

15. The production plant as claimed in claim 14 wherein the supply network comprises components selected from the group consisting of at least one compressed air lines, at least one feed water line, at least one electrical line, at least one materials line, at least one cooling line, and at least one heating line, or any combination thereof.

16. The production plant as claimed in claim 13 further comprising at least one storage container provided within the housing of at least one of the at least two process modules (P1, . . . Pn).

17. The production plant as claimed in claim 1 wherein the communication network is permanently installed.

18. The production plant as claimed in claim 1 wherein the particular process section is chosen from the group consisting of heating, cooling, mixing, separating, controlling pressure, ventilating, venting or any combination thereof.

19. The production plant as claimed in claim 1 wherein the production plant is configured to produce the chemical and/or pharmaceutical product is produced using a batch reaction process.

20. The production plant as claimed in claim 1 wherein the production plant is configured to produce the chemical and/or pharmaceutical product is produced using a continuous production process.

* * * * *

UNITED STATES PATENT AND TRADEMARK OFFICE
CERTIFICATE OF CORRECTION

PATENT NO. : 10,108,184 B2
APPLICATION NO. : 14/437747
DATED : October 23, 2018
INVENTOR(S) : Stefan Ochs et al.

Page 1 of 1

It is certified that error appears in the above-identified patent and that said Letters Patent is hereby corrected as shown below:

On the Title Page

Item (72) Inventors should read: Stefan Ochs, Köln (DE): Stefan Schmitz, Köln (DE); Gerd Jagusch, Leverkusen (DE): Carsten Meyer, Köln (DE); Maik Busse, Langenfeld (DE)

Signed and Sealed this
Eleventh Day of December, 2018

Andrei Iancu
*Director of the United States Patent and Trademark Office*